United States Patent [19]

Dang et al.

[11] Patent Number: 5,017,915
[45] Date of Patent: May 21, 1991

[54] METHOD OF ENHANCING COMMUNICATION SETUP BETWEEN A COMMUNICATION STATION AND A TELECOMMUNICATIONS NETWORK

[76] Inventors: Mieu-Hong Dang, 2100 Taylor Simonetti Ave., Austin, Tex. 78728; Jorge R. Taborga, 1802 Rainy Meadows Dr., Austin, Tex. 78758

[21] Appl. No.: 246,561

[22] Filed: Sep. 19, 1988

[51] Int. Cl.$^5$ ............................................. H04Q 9/00
[52] U.S. Cl. ............................ 340/825.06; 340/825.16
[58] Field of Search ...................... 340/825.06, 825.16; 370/79, 84, 99, 17; 375/8, 13, 121; 379/93, 94, 97, 98, 100, 216; 371/49.1

[56] References Cited

U.S. PATENT DOCUMENTS

| | | | |
|---|---|---|---|
| 4,620,294 | 10/1986 | Leling et al. | 379/98 |
| 4,621,366 | 11/1986 | Cain et al. | 375/13 |
| 4,680,781 | 7/1987 | Amundson et al. | 379/93 |
| 4,688,170 | 8/1987 | Waite et al. | 379/93 |
| 4,733,303 | 3/1988 | Koshiishi | 370/84 |
| 4,734,931 | 3/1988 | Bourg et al. | 379/94 |
| 4,756,007 | 7/1988 | Qureshi et al. | 370/84 |
| 4,780,883 | 10/1988 | O'Connor et al. | 375/121 |
| 4,864,557 | 9/1989 | Morton et al. | 370/17 |

OTHER PUBLICATIONS

Data Communications User Manual for the CBX 8000, Release 8004 May 1985, pp. 28, 34, 52, 53.
Data Communications User Guide for the Model 9751 CBX, May 1988, p. 30.

Primary Examiner—Sandra L. O'Shea
Assistant Examiner—Edwin C. Holloway, III
Attorney, Agent, or Firm—Andrew J. Dillon

[57] ABSTRACT

A method is disclosed for enhancing communication setup between a communication station and a telecommunications network. An initial setup communication from the communication station is transmitted at a normal data rate and the response from the telecommunications network is utilized to selectively enable transmission at a higher data rate for subsequent communications. Additionally, requested communication parameters are compared to previously utilized parameters which have been stored. Communication is established by setting only those parameters which do not match previously stored parameters. In a preferred embodiment of the present invention, a selected data call number is stored at the telecommunications network and automatically invoked by the communication station in response to the establishment of communication.

3 Claims, 4 Drawing Sheets

1

METHOD OF ENHANCING COMMUNICATION SETUP BETWEEN A COMMUNICATION STATION AND A TELECOMMUNICATIONS NETWORK

BACKGROUND OF THE INVENTION

1. Technical Field

This invention relates in general to methods for enhancing communication setup between a communication station and a telecommunications network, and in particular to methods for establishing communication at an increased data rate. Still more particularly, this invention relates to methods for establishing communication between a communication station and a telecommunications network by minimizing the number of communication parameters which must be set before communication is established.

2. Background Art

It is well known in the prior art to utilize computer program controlled telephone switching systems to interconnect individual telephone stations, digital terminals, personal computers and large main-frame computers. Such intercommunications may be utilized to provide voice and/or data communications. In a typical application, the telephone switching system is utilized to establish communication connections between two communication stations, both of which may include an associated computer facility connected to a communications pair. Thereafter, the operator generally utilizes a modem which converts digital signals output by a computer to analog signals suitable for transmission by the telephone system. Alternately, certain systems permit direct communication by digital signals over special communication pairs.

More recently, certain systems have been proposed which incorporate computer facilities which are directly connected to a communications pair. In such systems, the computer facility is utilized to emulate the functions of a telephone communication system. In this manner, the telephone communication station is no longer required for computer data call origination purposes.

In either of the two aforementioned systems, it is common during call setup for a multitude of command and information messages to be transmitted back and forth between a computer facility and a second computer facility, or a Private Branch Exchange (PBX). Such messages may be directed toward acknowledgement of selected parity, data rate, and other call parameters, as well as indications of the progress of the interconnection.

The process involved in this communication setup typically takes approximately twelve to fourteen seconds to complete. While this does not represent a substantial time period, systems which must establish many such calls could save substantial time by reducing the amount of time required for each call setup. It should therefore be apparent that a need exists for a method which can substantially reduce the amount of time required for call setup between a communication station and a telecommunications network.

SUMMARY OF THE INVENTION

It is therefore one object of the present invention to provide a method of enhancing communication setup between a communication station and telecommunications network.

It is another object of the present invention to provide a method of enhancing communication setup between a communication station and a telecommunications network which permits higher data rate communication where acceptable to the telecommunications network.

It is yet another object of the present invention to provide a method of enhancing communication setup between a communication station and a telecommunication network by resetting only those communication parameters which vary from previously utilized parameters.

The foregoing objects are achieved as is now described. An initial setup communication from the communication station is transmitted at a normal data rate and the response from the telecommunications network is utilized to selectively enable transmission at a higher data rate for subsequent setup communications. Additionally, requested communication parameters are compared to previously utilized parameters which have been stored. Communication is then established by setting only those parameters which do not match previously stored parameters. In a preferred embodiment of the present invention a selected data call number may be stored at the telecommunications network and automatically invoked by the communication station in response to the establishment of communication.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
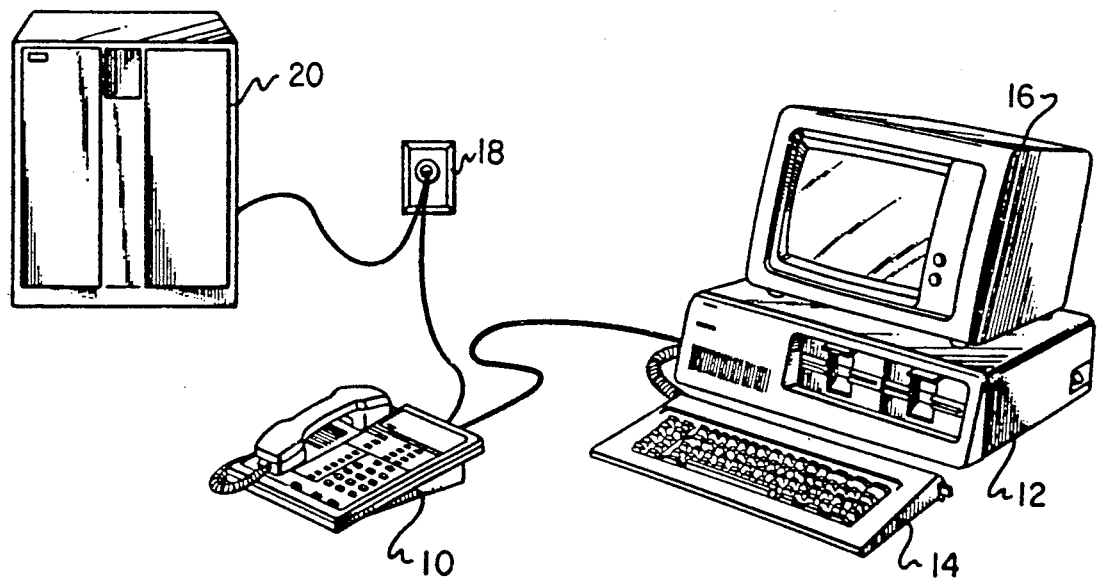
FIG. 1 depicts a pictorial representation of a communication system which may be utilized in accordance with the method of the present invention.

With reference now to the figures, and in particular with reference to FIG. 1, there is depicted a pictorial representation of a communication system which may be utilized in accordance with the method of the present invention. As may be seen, the communication system includes a telephone 10 which preferably permits both voice and data communication. Telephone 10 may be implemented utilizing any telephone having a data/telephony capability, such as the ROLMphone 244PC, manufactured by International Business Machines Corporation. Telephone 10 is coupled, via a standard EIA-232D cable to a serial asynchronous port within computer 12.

Computer 12 within the depicted system is preferably provided by utilizing an IBM Personal Computer, an IBM Personal System/2 or other similar system. As those skilled in this art will appreciate, computer 12 generally includes both a keyboard 14 and a video display device 16, which may be utilized to allow operator input and to provide user discernible messages to an operator of the communication system depicted.

In the system illustrated, telephone 10 may be utilized for data communication in a manner very similar to that of a modem due to the fact that the ROLMphone 244PC will support the AT command set which is utilized in most modems. To permit such communication, telephone 10 is connected to a telecommunication system such as a Private Branch Exchange (PBX) 20 which may be implemented utilizing the ROLM Computerized Branch Exchange (CBX). This connection is preferably made via a distributed wiring system which includes a plurality of telephone outlets 18.

Figure 2:
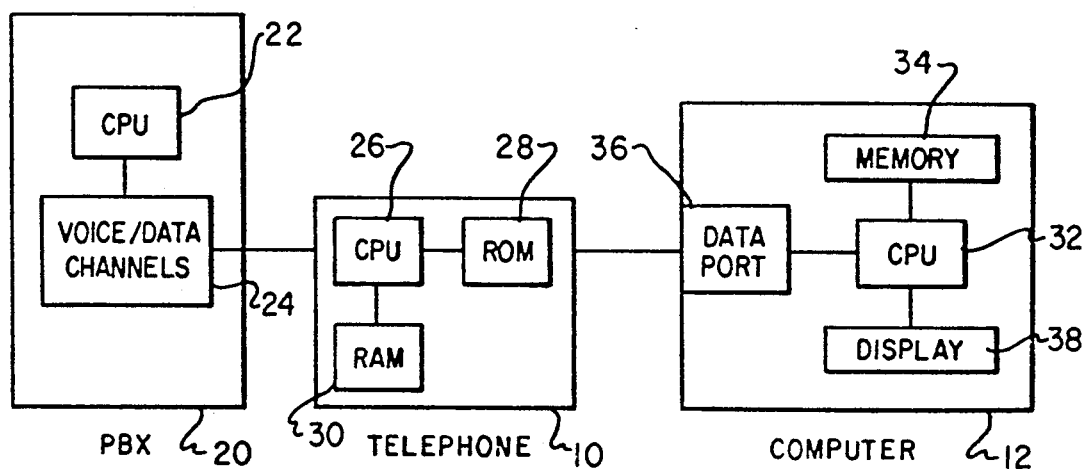
FIG. 2 depicts a high level block diagram of the communication system of FIG. 1.

Referring now to FIG. 2, there is depicted a high level block diagram of the communication system depicted in FIG. 1. As may be seen, telephone 10 preferably includes a Central Processing Unit (CPU) 26 as well as both Read-Only-Memory (ROM) 28 and Random-Access-Memory (RAM) 30, which may be utilized in a manner well known in the art to store the control sequences utilized by Central Processing Unit 26 to operate telephone 10 in accordance with the method of the present invention, Central Processing Unit 26 is preferably implemented utilizing a Motorola 68000 processor. Of course, those skilled in this art will appreciate that telephone 10 will also include circuitry which supports a databus as well as the telephone and audio sections of telephone 10.

As is typical of communication systems of this type, Private Branch Exchange 20 also includes a Central Processing Unit 22 which may be utilized to control the activity of voice/data channels 24. Finally, computer 12 also includes a Central Processing Unit 32 which is coupled, in a manner well known in the computer art, to memory 34, data port 36 and display driver 38. Of course, memory 34 will generally consist of a combination of Read-Only-Memory and Random-Access-Memory as well as those types of memory typically supported on magnetic media such as floppy disk.

Figure 3:
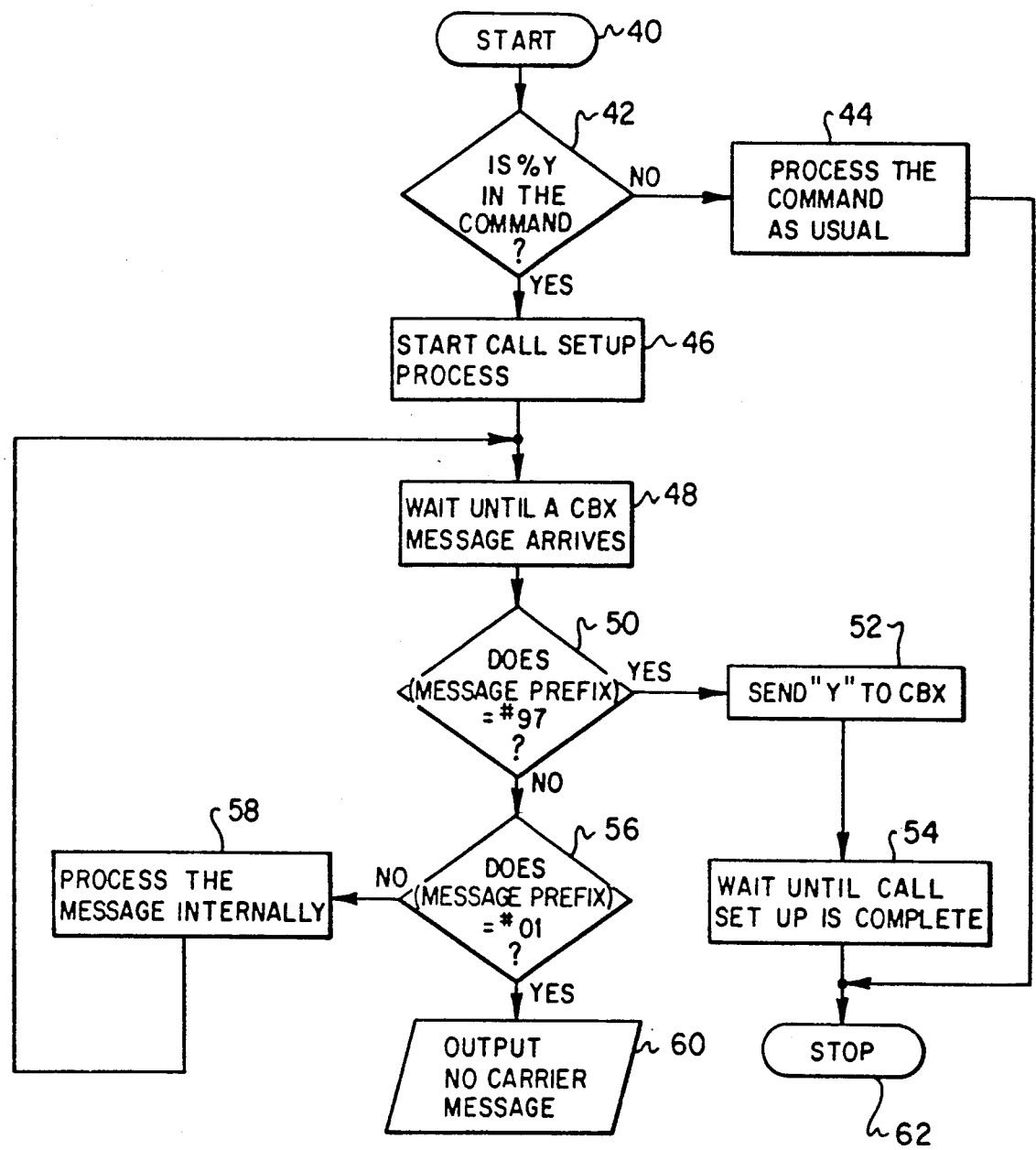
FIG. 3 depicts a logic flow chart illustrating the automatic call technique of the method of the present invention.

With reference now to FIG. 3, there is depicted a logic flow chart illustrating the automatic call technique method of the present invention. As is illustrated, the method of the present invention begins at block 40 where a command is received from the operator of computer 12. Such commands are coupled, via data port 36, to telephone 10 (see FIG. 2). Central Processing Unit 26, within telephone 10, is programmed to respond to so-called "AT" modem commands and determines, as depicted in block 42, whether or not the user has entered a "%Y" command within the AT command line. The %Y command is the command which is utilized, in conjunction with the method of the present invention, to signify the desire of the operator to automatically invoke the automatic call or "Autocall" capability of the method of the present invention.

Autocall is a technique known in the art whereby a selected data call number may be stored within a Private Branch Exchange (PBX) and made available to the operator of a communication station as an option which may be manually selected during call setup. In contrast, to this known technique, the method of the present invention utilizes the %Y command in a manner which will be explained in greater detail herein to automatically invoke the Autocall capability when selected by the operator.

If the Autocall %Y command is not present within the AT command line as determined by block 42, then block 44 illustrates the processing of the command in the usual manner. Thereafter, the process terminates as depicted in block 62. However, if the Autocall %Y command is present within the AT command line, then block 46 depicts the beginning of the call setup process.

Next, block 48 illustrates the process waiting until a message arrives from the Computerized Branch Exchange (CBX). Block 50 is then utilized to determine whether or not the message prefix from the Computerized Branch Exchange (CBX) is equal to "#97," indicating that the Autocall function is available to the communication station and asking if the communication station desires to utilize the Autocall option. In this case, block 52 depicts the automatic transmission of a "yes" signal to the Computerized Branch Exchange (CBX) in response to the utilization of the Autocall %Y command. Next, block 54 illustrates the process waiting until the call setup is complete before terminating the process as illustrated in block 62.

If the message prefix received from the Computerized Branch Exchange (CBX) is equal to "#01," indicating that no data call number is stored within the Computerized Branch Exchange (CBX), then block 60 illustrates the output of a "NO CARRIER" message, indicating that the call was not completed. In the event an unspecified message has arrived from the Computerized Branch Exchange (CBX) then block 58 illustrates the processing of that message internally. Thereafter, the process returns to block 48 to await the arrival of a subsequent message from the Computerized Branch Exchange (CBX).

Figure 4A:
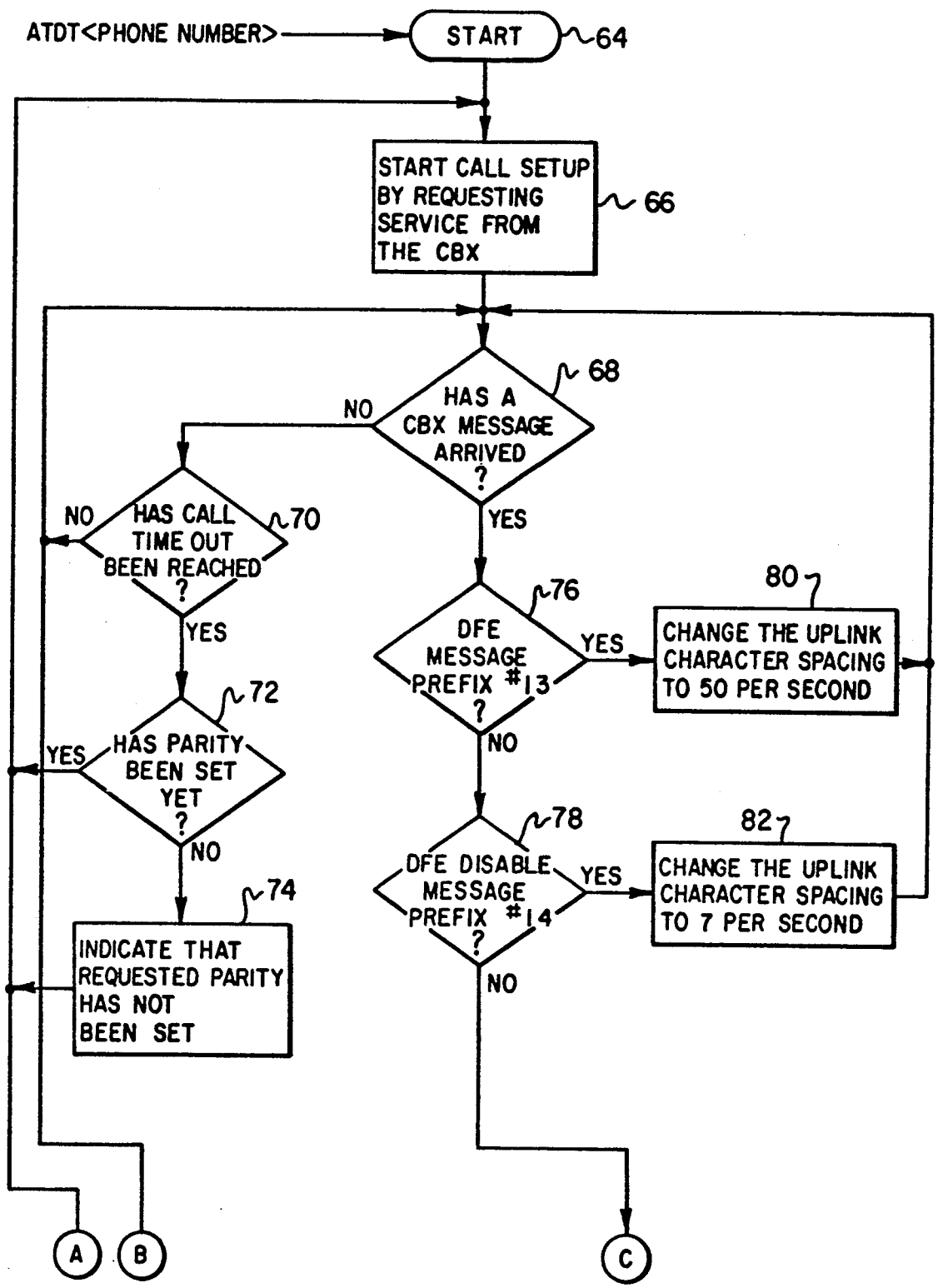
FIGS. 4a and 4b form a logic flow chart illustrating the enhanced data rate and stored communication parameter techniques of the method of the present invention.
Figure 4B:
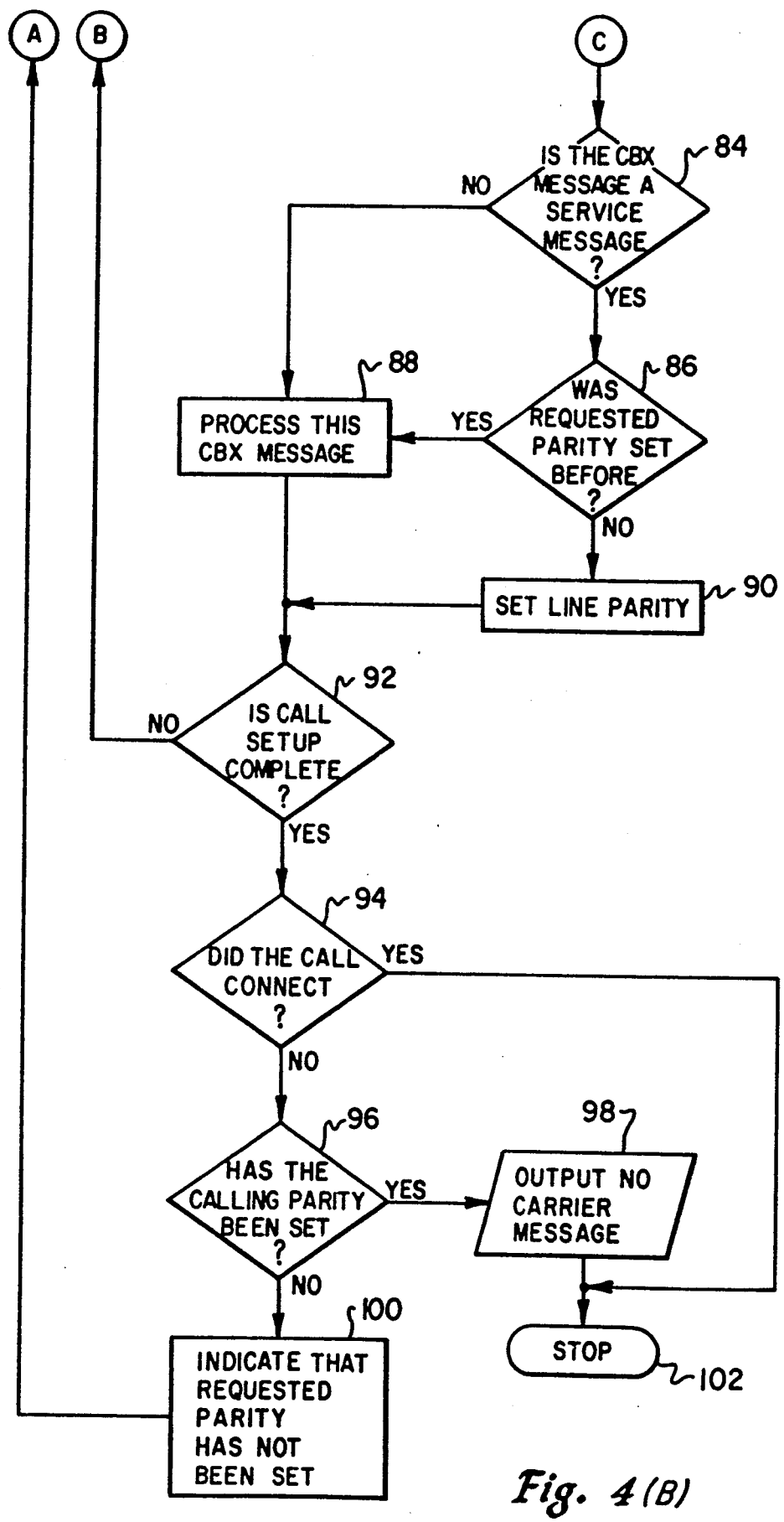

Referring now to FIGS. 4a and 4b, there is depicted a logic flow chart which illustrates the enhanced data rate and stored communication parameter techniques of the method of the present invention. As above, the process begins with block 64 where a command is received from the operator of computer 12. Again, such commands are coupled, via data port 36, to telephone 10 (see FIG. 2). In the event the command received is an ATDT command, indicating the desire of the operator of the ROLMphone 244PC to place a data call, then block 66 illustrates the beginning of the call setup process by requesting service from the Computerized Branch Exchange (CBX).

Next, block 68 is utilized to determine whether or not a message has arrived from the Computerized Branch Exchange (CBX). If not, block 70 is utilized to illustrate the determination of whether or not a call timeout has been reached. Those skilled in the art will appreciate that in many communications applications if a call has not been completed by the termination of a selected time period then the attempt at communication is terminated. If call timeout has not been reached, the process returns to block 68 to await a message from the Computerized Branch Exchange (CBX).

In the event that call timeout has occurred without a connection being made, then block 72 illustrates a determination of whether or not parity for the requested communication has been set. In accordance with an important aspect of the present invention, the desired parity for a communications setup may not be set if the requested parity is identical to the previous parity utilized by the system. If parity has been set, as determined by block 72, then the process returns to block 66 to attempt a call the second time. If parity has not been set, then block 74 is utilized to indicate that fact and the process returns to block 66 to attempt to establish communication a second time.

Returning again to block 68, after a message is received from the Computerized Branch Exchange (CBX), block 76 is utilized to determine whether or not the prefix of the message is equal to "#13." This command is utilized, in accordance with the method of the present invention, to indicate a telecommunications network which will support a higher pacing rate during call setup. That is, a higher data rate of communications between the communication station and the telecommunications network. In the event the message prefix is equal to #13, then block 80 illustrates the changing of the uplink character pacing to fifty characters per second from the nominal seven characters per second which is generally utilized.

Block 78 is utilized to determine whether or not the message prefix from the Computerized Branch Exchange (CBX) is equal to #14, indicating that the uplink character spacing should revert to seven characters per second. Next, block 84 is utilized to illustrate the determination of whether or not the Computerized Branch Exchange (CBX) message is a service message, that is, a "Call, Display, or Modify?" message. If not, the message is processed, as illustrated in block 88.

If the message detected at block 84 is a service message, then block 86 is utilized to depict a determination of whether or not the requested parity has been previously set. If the requested parity is equal to the previously utilized parity, block 88 illustrates the processing of this message without resetting the parity value. If the requested parity is not equal to previously utilized parity, block 90 illustrates the setting of line parity in accordance with the requested parameters.

This important feature of the method of the present invention permits a substantial time savings in call setup between a communication station and a telecommunications network by storing the previously utilized parity value and comparing the requested parity with this previously utilized value. In the event the parity values are equal, the system assumes that the parity value need not be changed and the communication station automatically attempts to establish communication with the previously utilized parity parameter. Of course, in the event the communications parameters have been altered since the previous attempt at communication, the duration of time required to establish communication will approximately double; however, the substantial time savings realized on those occasions when parity parameters have not varied will compensate for this occasional problem.

After processing the service message received from the Computerized Branch Exchange (CBX), block 92 illustrates the determination of whether or not the call setup has been completed. If not, the process returns to block 68 to await the arrival of a subsequent Computerized Branch Exchange (CBX) message.

In the event the call setup is complete, block 94 is utilized to determine whether or not the call was successfully connected. If so, the process terminates as illustrated at block 102. If the call did not in fact connect, then block 96 illustrates the determination of whether or not the requested parity parameter was set. If not, block 100 is utilized to provide an indication that the requested parity parameter was not set and the process returns to block 66 to restart the call. If the requested parity parameter was set, then the process passes to block 98 which illustrates the outputting of a "NO CARRIER" message indicating the data call was not completed. Thereafter, the process terminates as illustrated in block 102.

Those skilled in this art will appreciate that by utilizing the methods of the present invention a substantial savings in the time required to establish a data call between a communication station and Computerized Branch Exchange (CBX), or telecommunications network may be obtained. By enhancing the data rate at which call setup communication takes place when the telecommunications network will accept higher data rates, the actual process of communication will be substantially speeded up. Similarly, the utilization of previously stored parity parameters will generate a substantial time savings in communication establishment where the communication parameters have not been altered.

While the invention has been particularly shown and described with reference to a preferred embodiment, it will be understood by those skilled in the art that various changes in form and detail may be made therein without departing from the spirit and scope of the invention.

We claim:

1. A method of enhancing communication setup between a communication station and a telecommunications network, said method comprising the steps of:
    storing a selected communications parameter from a previous communication;
    comparing said stored selected communication parameter with requested communication parameters for a current communication attempt; and
    establishing communication between said communication station and said telecommunications network by setting only those communication parameters not identical to said stored selected communication parameter.

2. A method of enhancing communication setup between a communication station and a telecommunications network according to claim 1 wherein said selected communication parameter comprises a parity setting.

3. A method of enhancing communication setup between a communication station and telecommunications network according to claim 1 further including the step of establishing communication between said communication station and said telecommunications network by setting said requested communication parameters in response to a failure to establish communication.

* * * * *